United States Patent Office 3,317,544
Patented May 2, 1967

3,317,544
3-TROPINYL ESTERS OF SUBSTITUTED ACRYLIC AND THIO ACRYLIC ACIDS
Henry C. Caldwell, Ambler, and William G. Groves, Norristown, Pa., assignors to Smith Kline & French Laboratories, Philadelphia, Pa., a corporation of Pennsylvania
No Drawing. Filed Feb. 18, 1965, Ser. No. 433,779
5 Claims. (Cl. 260—292)

This invention relates to 3-tropanyl-2-phenylacrylate derivatives containing pharmaceutical compositions and the method of producing gastrointestinal spasmolytic activity using said derivatives. More specifically this invention relates to a method of producing spasmolytic activity without the concomitant limiting or anticholinergic side effects common to the prior art spasmoyltic drugs.

Prior to the present invention there has been a great need for compounds and compositions which produce spasmoyltic activity without the usual anticholinergic side effects, such as, for example, dry mouth, blurred vision and urinary retention which are common to known anticholinergic-antispasmodic drugs. The need of a safe and effective composition devoid of the above noted side effects and having spasmolytic activity has been great.

The novel 3-tropanyl-2-phenylacrylate containing medicinal compositions of this invention are consistently effective in producing spasmolytic activity without the concomitant mydriatic and antisalivary side effects known to be present when utilizing prior art spasmolytic agents.

The 3-tropanyl-2-phenylacrylate ingredients of this invention are represented by the following formula:

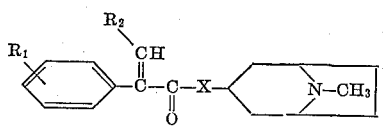

Formula 1
when:

X represents oxygen or sulfur;
$R_1$ represents hydrogen, a straight or branched chain lower alkyl of 1 to 6 carbon atoms preferably methyl or ethyl, lower alkoxy of 1 to 6 carbon atoms preferably methoxy or ethoxy, halogen such as bromo, chloro, or fluoro, hydroxy, nitro, cyano or trifluoromethyl; and
$R_2$ represents phenyl or substituted phenyl in which the substituents are lower alkyl, lower alkoxy, halogen such as chloro, bromo or fluoro, hydroxy, nitro, cyano, and trifluoromethyl, furyl, thienyl and pyridyl.

Advantageous compounds of this invention are represented by the above structural formula when $R_1$ represents halo such as chloro, bromo or fluoro, ethoxy or methoxy and $R_2$ represents phenyl.

The preferred and most advantageous compound of this invention is represented by the following structural formula:

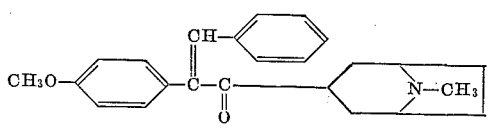

Formula 2
The substituted tropanyl acrylates are prepared according to the following synthetic procedure:

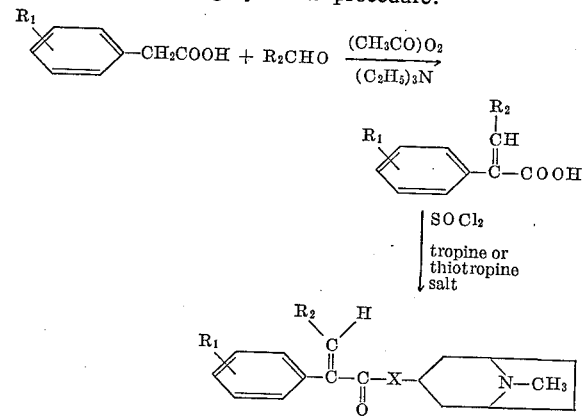

The method is carried out using readily available starting materials and gives excellent yields of the end product. Where certain compounds desired for use as starting materials are not available they can be prepared by methods described in the literature and well known to the art for preparing analogous compounds as described in the examples.

The properly substituted phenylacetic acid is converted to the corresponding 3-substituted 2-phenylacrylic acid derivatives by reacting the acid with an aromatic aldehyde in an organic solvent such as, acetic anhydride and using a tertiary amine such as triethylamine, pyridine or N,N'-dimethylaniline as a catalyst. The mixture is then heated. The 2-phenylacrylic acid derivative is then converted to the desired 3-tropanyl-2-phenylacrylate by preparing the acyl chloride or anhydride first then reacting with tropine, thiotropine or a salt thereof.

This invention also includes nontoxic pharmaceutically acceptable addition salts of the above defined bases formed with organic and inorganic acids. Such salts are easily prepared by methods known to the art. The base is reacted with either the stoichiometric amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicyclic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzenesulfonic and theophylline acetic acids as well as with the 8-halotheophyllines for example, 8-chlorotheophylline and 8-bromotheophylline. Exemplary of such inorganic salts are those with hydrochloric, hydrobromic, sulfuric, sulfamic, phosphoric and nitric acids. These salts may also be prepared by the classical method of double decomposition of appropriate salts which is well known to the art.

Further, exemplary of salts are nontoxic quaternary ammonium salts of the above defined bases formed with pharmacologically acceptable lower alkyl or aralkyl esters of, for example, sulfuric, hydrohalic and aromatic sulfonic acids. These salts are prepared by treating a solution of the base in a suitable solvent, such as chloroform, acetone, benzene, toluene or ether with an excess of an organic ester of sulfuric, hydrohalic or aromatic sulfonic acid. This reaction is carried out most advantageously at a temperature in the range of from about 25° C. to about 115° C. Exemplary of such reactive esters are lower alkyl halides of a maximum of 8 carbon atoms such as methyl chloride, methyl bromide, methyl iodide, ethyl chloride, propyl bromide, butyl chloride, isobutyl chloride, ethylene bromohydrin, ethylene chlorohydrin, allyl bromide, methallyl bromide, crotyl bromide, benzyl chloride, benzyl bromide, naphthylmethyl chloride, phenethyl bromide, dimethyl sulfate, diethyl sulfate, methyl benzene sulfate and ethyl toluene sulfonate.

It will be readily apparent to one skilled in the art that variations of these procedures are possible. The preferable preparative procedures are the methods discussed above.

The substituted 3-tropanyl-2-phenylacrylate of Formula 1 or a nontoxic salt thereof will be present in an amount to produce gastrointestinal spasmolytic activity. Preferably the composition will contain the 3-tropanyl acrylate ingredient in either a liquid or solid nontoxic pharmaceutical carrier in an amount of from about 2.0 mg. to about 100 mg., advantageously from about 5 mg. to about 50 mg. per dosage unit.

The pharmaceutical carrier may be, for example, either a solid or a liquid. Exemplary of solid carries are lactose, magnesium stearate, terra alba, sucrose, talc, stearic acid, gelatin, agar, pectin or acacia. Exemplary of liquid carriers are peanut oil, olive oil, sesame oil and water. Similarly, the carrier or diluent may include a time delay material such as glyceryl monostearate or glyceryl distearate alone or with a wax.

A wide variety of pharmaceutical forms can be employed. Thus, if a solid carrier is used, the preparation can be tabletted, placed on a hard gelatin capsule or in the form of a troche or lozenge. The amount of solid carrier will vary widely but preferably will be from about 25 mg. to about 1 gm. If a liquid carrier is used, the preparation may be in the form of a soft gelatin capsule, placed in an ampule or in a liquid suspension.

The method in accordance with this invention comprises administering internally preferably orally to a warm blooded vertebrate animal a compound of Formula 1 or a nontoxic salt thereof preferably admixed with a pharmaceutical carrier, in an amount sufficient to induce a spasmolytic but nontoxic effect. The properly substituted 3-tropanyl-2-phenylacrylate ingredient preferably will be, per unit, in an amount of from about 2.0 mg. to about 100 mg. and advantageously from about 5 mg. to about 50 mg. The administration may be parenterally or orally, the latter being the preferable route of administration. Advantageously equal doses will be administered one to four times daily. Preferably the daily dosage will be from about 2.0 mg. to about 400 mg. and most advantageously from about 5 mg. to about 200 mg. of active medicament in pharmaceutical forms. When the administration described above is carried out, spasmolytic activity is achieved without the mydriatic and antisalivary side effects common to known antispasmodic drugs.

The following examples are not limiting but are illustrative of compounds of this invention and the procedures for their preparation. It will be understood that the advantageous spasmolytic activity of this invention lies in the parent 3-tropanyl-2-phenylacrylate nucleus. Substitution on the 3-aryl substituent has been found not to effect activity and may be varied widely as will be apparent to those skilled in the art. Substitution in the 2-phenyl ring particularly in the p-position gives very active but specifically acting compounds as the preferred groups of compounds outlined herebefore reflect. Other variations of this invention will be obvious to those skilled in this art.

*Example 1*

To a mixture containing 58.4 g. of p-methoxyphenylacetic acid, 35.8 ml. of benzaldehyde and 48.8 ml. of triethylamine is added with cooling 132.8 ml. of acetic anhydride. The mixture is stirred for approximately ½ hour and then heated in an oil bath at 70° C. The temperature is raised to 100° C. over a ½ hour period and heating continued for approximately five hours. The solution is cooled and made acidic with concentrated hydrochloric acid. The crude acid is filtered, dried and recrystallized from alcohol to yield 2-p-methoxyphenyl-3-phenylacrylic acid as a yellow-white solid having a melting point of 152° C. to 154° C.

A suspension of 43.8 g. of 2-p-methoxyphenyl-3-phenylacrylic acid, 70 ml. of dry benzene and 30 ml. of thionyl chloride is warmed gently until a solution results. The clear solution is refluxed for about an hour and the excess thionyl chloride and benzene is removed by asperator. The solution is further washed with three separate portions of dry benzene. To the resulting oil is added 34.3 g. of tropine hydrobromide and the mixture is then chilled. To this mixture is added 25 ml. of dry pyridine and the solution is stirred for about ½ hour at room temperature and then at 60° C. to 70° C. for one hour. The mixture solidifies during this process and 10 ml. of dry pyridine is added. Then 100 ml. of water is added and the solution warmed and treated with charcoal. The solution is made basic and the free base is extracted with ether and dried. The pyridine is removed by treatment with several portions of benzene. The benzene is distilled off to yield 3-tropanyl-2-p-methoxyphenyl-3-phenylacrylate as an oily base.

An ethereal solution of the free base is treated with hydrogen chloride to yield the hydrochloride salt as a white solid and having a melting point of 263.5° C. to 264.5° C.

Similarly using the above procedure 58.4 g. of m-methoxyphenylacetic acid used as a starting material yielded 3-tropanyl-2-m-methoxyphenyl-3-phenylacrylate.

EXAMPLE 2

To a mixture containing 30.0 g. of p-chlorophenylacetic acid, 20.01 ml. of benzaldehyde and 24.4 ml. of triethylamine is added with cooling 66.4 ml. of acetic anhydride. The mixture is stirred for approximately ½ hour and then heated to 70° C. The temperature is raised to 100° C. for a period of ½ hour and then the mixture is heated for approximately six additional hours. 100 ml. of benzene is added and the solution is extracted with four 125 ml. portions of hot 10% sodium hydroxide. The solution is then cooled and made acidic with concentrated hydrochloric acid. The crude acid is filtered, dried and recrystallized from alcohol to yield 2-p-chlorophenyl-3-phenylacrylic acid as a white solid melting at 180° C. to 181.5° C.

A suspension of 51.7 g. of 2-p-chlorophenyl-3-phenylacrylic acid, 40.0 ml. of thionyl chloride and 50 ml. of dry benzene is warmed gently until a solution results. The clear solution is refluxed for about an hour and the excess thionyl chloride and benzene is removed. The solution is further washed with three portions of dry benzene. To the resulting oil is added 39.8 g. of tropine hydrobromide and the mixture is then cooled. To this mixture is added 125 ml. of dry pyridine and the solution is stirred for about ½ hour at room temperature and then at 60° C. to 70° C. for one hour. The mixture solidifies during this process and 10 ml. of dry pyridine is added. Then 100 ml. of water is added and the solution warmed and treated with charcoal. The solution is made basic and the free base is extracted with ether and dried. The pyridine is removed by treatment with several portions of benzene. The benzene is distilled off to yield 3-tropanyl-2-p-chlorophenyl-3-phenylacrylate as an oily base.

An ethereal solution of the free base is treated with hydrogen chloride to yield the salt as a white solid and having a melting point of 254° C. to 255° C.

Example 3

To a mixture containing 30.0 g. of p-chlorophenylacetic acid, 16.3 ml. of 2-thiophenealdehyde and 24.4 ml. of triethylamine is added 66.4 ml. of acetic anhydride. The mixture is heated at 150° C. for about ½ hour and cooled to room temperature. The liquid is acidified with concentrated hydrochloric acid and the precipitated crude acid is extracted with 300 ml. of methylene chloride. The methylene chloride solution is washed with about 500 ml. of water and then extracted several times with 2% sodium hydroxide and the basic solution cooled in ice. The solution is acidified with glacial acidic acid, cooled to 5° C., and the acid filtered and dried. The acid is recrystallized from alcohol to yield 2-p-chlorophenyl-3-(2-thienyl)acrylic acid as a yellow-white solid having a melting point of 222° C. to 223° C.

A suspension of 13.2 g. of 2-p-chlorophenyl-3-(2-thienyl)acrylic acid, 10.0 ml. of thionyl chloride and 15 ml. of dry benzene is warmed gently until a soltuion results. The clear solution is refluxed for about an hour and the excess thionyl chloride and benzene is removed. The solution is further washed with three portions of dry benzene. To the resulting oil is added 9.95 g. of tropine hydrobromide and the mixture is then cooled. To this mixture is added 15 ml. of dry pyridine and the solution is stirred for about ½ hour at room temperature and then at 60° C. to 70° C. for one hour. The mixture solidifies during this process and 30 ml. of dry pyridine is added. Then 100 ml. of water is added and the solution warmed and treated with charcoal. The solution is made basic and the free base is extracted with ether and dried. The pyridine is removed by treatment with several portions of benzene. The benzene is distilled off to yield 3-tropanyl-2-p-chlorophenyl-3-(2-thienyl) acrylate as an oily base.

An ethereal solution of the free base (500 mg.) is treated with hydrogen chloride to yield the salt as a white solid and having a melting point of 270° C. to 271.5° C.

An ethereal solution of the base (500 mg.) is reacted with an excess of ethyl iodide to separate the ethiodide salt.

Example 4

To a mixture containing 30.0 g. of p-chlorophenylacetic acid, 14.5 ml. of 2-furfural and 24.4 ml. of triethylamine is added, 66.4 ml. of acetic anhydride. The mixture is heated on an oil bath at 100° C. for about one hour, cooled to room temperature and taken up in acetone. The solution is heated with activated carbon, filtered and the acetone evaporated. The mixture is then acidified with concentrated hydrochloric acid, cooled and filtered. The crude acid is recrystallized twice from alcohol to yield 2-p-chlorophenyl-3-(2-furyl)acrylic acid as a yellow-white solid melting at 212° C. to 213° C.

A suspension of 14.5 g. of 2-p-chlorophenyl-3-(2-furyl) acrylic acid, 10.0 ml. of thionyl chloride and 15 ml. of dry benzene is warmed gently until a solution results. The clear solution is refluxed for about an hour and the excess thionyl chloride and benzene is removed. The solution is further washed with three portions of dry benzene. To the resulting oil is added 11.5 g. of tropine hydrobromide and the mixture is then chilled. To this mixture is added 25 ml. of dry pyridine and the solution is stirred for about ½ hour at room temperature and then at 60° C. to 70° C. for one hour. The mixture solidifies during this process and 25 ml. of dry pyridine is added. Then 100 ml. of water is added and the solution warmed and treated with charcoal. The solution is made basic and the free base is extracted with ether and dried. The pyridine is removed by treatment with several portions of benzene. The benzene is distilled off to yield 3 - tropanyl - 2 - p-chlorophenyl-3-(2-furyl)acrylate as on oily base.

An ethereal solution of the free base is treated with hydrogen chloride to yield the hydrochloride salt as a white solid and having a melting point of 244° C. to 244.5° C.

Example 5

To a mixture containing 30.0 g. of p-chlorophenylacetic acid, 18.5 g. of 4-pyridylcarboxaldehyde, 24.4 ml. of triethylamine is added 66.4 ml. of acetic anhydride. The mixture is stirred for approximately one hour at room temperature. The solution is cooled and made acetic with concentrated hydrochloric acid. The crude acid is filtered, dried and recrystallized from alcohol to yield 2-p-chloropyhenyl-3-(4-pyridyl)acrylic acid having a melting point of 278° C. to 279° C.

A suspension of 15.0 g. of 2-p-chlorophenyl-3-(4-pyridyl)acrylic acid, 20 ml. of thionyl chloride and 40 ml. of dry benzene is warmed gently until a solution results. The clear solution is refluxed for about an hour and the excess thionyl chloride and benzene is removed. The solution is further washed with three separate portions of dry benzene. To the resulting oil is added 10.0 g. of tropine hydrobromide and the mixture is then chilled. To this mixture is added 25 ml. of dry pyridine and the solution is stirred for about ½ hour at room temperature and then at 60° C. to 70° C. for one hour. The mixture solidifies during this process and 30 ml. of dry pyridine is added. Then 100 ml. of water is added and the solution warmed and treated with charcoal. The solution is made basic and the free base is extracted with ether and dried. The pyridine is removed by treatment with several portions of benzene. The benzene is distilled off to yield 3-tropanyl-2-p-chlorophenyl-3-(4-pyridyl) acrylate as an oily base.

Reacting the free base with bismethylene salicyclic acid in ethyl acetate solution furnishes the bismethylene salt.

Example 6

A suspension of 43.8 g. of 2-p-methoxyphenyl-3-phenylacrylic acid as prepared in Example 1, 70 ml. of dry benzene and 30 ml. of thionyl chloride is warmed gently until a solution results. The clear solution is refluxed for about an hour and the excess thionyl chloride and benzene is removed by asperator. The solution is further washed with three separate portions of dry benzene. To the resutling oil is added 35.5 g. of thiotropine hydrobromide and the mixture is then chilled. To this mixture is added 25 ml. of dry pyridine and the solution is stirred for about ½ hour at room temperature and then at 60° C. to 70° C. for one hour. The mixture solidifies during this process and 10 ml. of dry pyridine is added. Then 100 ml. of water is added and the solution warmed and treated with charcoal. The solution is made basic and the free base is extracted with ether and dried. The pyridine is removed by treatment with several portions of benzene. The benzene is distilled off to yield 3-thiotropanyl-2-p-methoxyphenyl-3-phenylacrylate as an oily base.

An acetone solution of the free base is reacted with ethyl bromide to yield the ethobromide quaternary salt.

Example 7

To a mixture containing 31.0 g. of p-ethylphenylacetic acid, 17.9 ml. of benzaldehyde and 24.4 ml. of triethylamine is added with cooling 66.6 ml. of acetic anhydride. The mixture is stirred for approximately ½ hour and then heated in an oil bath at 70° C. The temperature is raised to 100° C. over a half hour period and heating continued for approximately five hours. The solution is cooled and made acidic with concentrated hydrochloric acid. The crude acid is filtered, dried and recrystallized from alcohol to yield 2-p-ethylphenyl-3-phenylacrylic acid as a yellow-white solid having a melting point of 168° C. to 169.5° C.

A suspension of 20.0 g. of 2-p-ethylphenyl-3-phenylacrylic acid, 70 ml. of dry benzene and 20 ml. of thionyl chloride is warmed gently until a solution results. The clear solution is refluxed for about an hour and the excess thionyl chloride and benzene is removed by asperator. The solution is further washed with three separate portions of dry benzene. To the resulting oil is added 15.7 g. of tropine hydrobromide and the mixture is then chilled. To this mixture is added 40 ml. of dry pyridine and the solution is stirred for about ½ hour at room temperature and then at 60° C. to 70° C. for one hour. The mixture solidifies during this process and 10 ml. of dry pyridine is added. Then 100 ml. of water is added and the solution warmed and treated with charcoal. The solution is made basic and the free base is extracted with ether and dried. The pyridine is removed by treatment with several portions of benzene. The benzene is distilled off to yield 3-tropanyl-2-p-ethylphenyl-3-phenylacrylate.

An ethereal solution of the free base is treated with hydrogen chloride to yield the hydrochloride salt as a white solid and having a melting point of 245° C. to 246° C.

*Example 8*

To a mixture containing 28.6 g. of p-trifluoromethylphenylacetic acid, 15 ml. of benzaldehyde and 16.2 ml. of triethylamine is added with cooling 44 ml. of acetic anhydride. The mixture is stirred for approximately ½ hour and then heated in an oil bath at 70° C. The temperature is raised to 100° C. over a ½ hour period and heating continued for approximately five hours. The solution is cooled and made acidic with concentrated hydrochloric acid. The crude acid is filtered, dried and recrystallized from alcohol to yield 2-p-trifluoromethylphenyl-3-phenylacrylic acid as a yellow-white solid having a melting point of 221° C. to 221.5° C.

A suspension of 13. g. of 2-p-trifluoromethylphenyl-3-phenylacrylic acid, 20 ml. of dry benzene and 10 ml. of thionyl chloride is warmed gently until a solution results. The clear solution is refluxed for about an hour and the excess thionyl chloride and benzene is removed by asperator. The solution is further washed with three separate portions of dry benzene. To the resulting oil is added 9.1 g. of tropine hydrobromide and the mixture is then chilled. To this mixture is added 20 ml. of dry pyridine and the solution is stirred for about ½ hour at room temperature and then at 60° C. to 70° C. for one hour. The mixture solidfies during this process and 10 ml. of dry pyridine is added. Then 100 ml. of water is added and the solution warmed and treated with charcoal. The solution is made basic and the free base is extracted with ether and dried. The pyridine is removed by treatment with several portions of benzene. The benzene is distilled off to yield 3-tropanyl-2-p-trifluoromethylphenyl-3-phenylacrylate.

An ethereal solution of the free base is treated with hydrogen chloride to yield the hydrochloride salt as a white solid and having a melting point of 262° C. to 263° C.

*Example 9*

Similarly following the procedure of Example 8, 31.8 g. of p-nitrophenylacetic acid, 28.3 g. of p-cyanophenylacetic acid and 15.2 g. of p-hydroxyphenylacetic acid were employed as starting materials to yield respectively 3-tropanyl-2-p-nitrophenyl-3-phenylacrylate, 3-tropanyl-2-p-cyanophenyl-3-phenylacrylate and 3-tropanyl-2-p-hydroxyphenyl-3-phenylacrylate.

*Example 10*

Ingredients: Mg./tablet
3 - tropanyl-2-p-methoxyphenyl-3-phenylacrylate hydrochloride _____ 10
Calcium sulfate dihydrate _____ 175
Sucrose _____ 25
Starch _____ 15
Talc _____ 5
Stearic acid _____ 3

The sucrose, calcium sulfate and 3-tropanyl-2-p-methoxyphenyl-3-phenylacrylate hydrochloride are thoroughly mixed and granulated with hot 10% gelatin solution. The wetted mass is passed through a #16 U.S. standard mesh screen directly onto drying trays. The granules are dried at 120° F. and passed through a #20 U.S. standard mesh screen. These granules are then mixed with starch, talc and stearic acid, passed through a #60 U.S. standard mesh screen and then compressed into tablets.

One tablet is administered four times a day.

*Example 11*

Ingredients: Mg./tablet
3-tropanyl-2-p-chlorophenyl-3-phenylacrylate __ 25
Lactose _____ 275

The ingredients are thoroughly mixed and filled into a #2 hard gelatin capsule.

One capsule is administered twice a day.

*Example 12*

Ingredients: Mg./tablet
3-tropanyl-2-p-chlorophenyl - 3 - (2-thienyl) acrylate hydrobromide _____ 50.0
Magnesium stearate _____ 2.0
Lactose _____ 150.0

The above powders are thoroughly mixed and filled into a #2 hard gelatin capsule.

One capsule is administered twice daily.

*Example 13*

Ingredients: Mg./tablet
3 - tropanyl - 2 - p-chlorophenyl-3-(2-furyl) acrylate maleate _____ 5.0
Peanut oil _____ 200.0

The ingredients are mixed to a thick slurry and filled into soft gelatin capsules.

One capsule is administered three times a day.

What is claimed is:

1. A chemical compound of the formula:

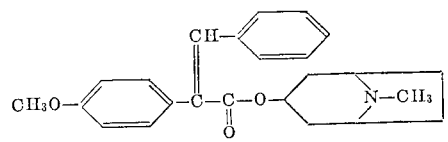

2. A chemical compound of the formula:

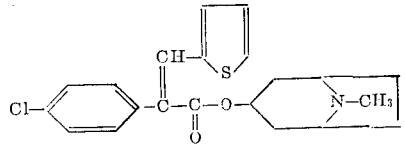

3. A chemical compound of the formula:
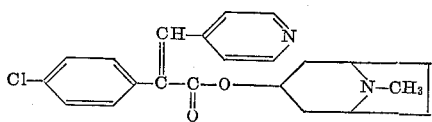
4. A chemical compound of the formula:
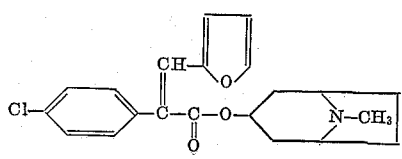
5. A chemical compound of the formula:
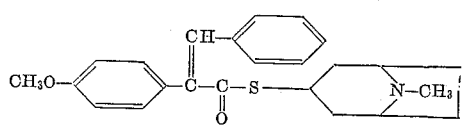
References Cited by the Examiner
Englehardt et al.: J. Arzneim.-Forsch. (7) pp. 217–22 (1957) (Germany).
WALTER A. MODANCE, *Primary Examiner.*
A. C. ROTMAN, *Assistant Examiner.*